(12) United States Patent
Taneya et al.

(10) Patent No.: US 7,002,616 B2
(45) Date of Patent: Feb. 21, 2006

(54) CELLULAR TELEPHONE

(75) Inventors: Yuichi Taneya, Osaka (JP); Masae Morioka, Osaka (JP); Hiroomi Kashu, Moriguchi (JP)

(73) Assignees: Sanyo Electric Co., Ltd., Moriguchi-shi (JP); Sanyo Telecommunications Co., Ltd., Daito-shi (JP)

( * ) Notice: Subject to any disclaimer, the term of this patent is extended or adjusted under 35 U.S.C. 154(b) by 3 days.

(21) Appl. No.: 10/488,107

(22) PCT Filed: Jan. 27, 2003

(86) PCT No.: PCT/JP03/00743

§ 371 (c)(1),
(2), (4) Date: Mar. 9, 2004

(87) PCT Pub. No.: WO03/065692

PCT Pub. Date: Aug. 7, 2003

(65) Prior Publication Data

US 2004/0259592 A1    Dec. 23, 2004

(30) Foreign Application Priority Data

Jan. 31, 2002   (JP) .............................. 2002-024453

(51) Int. Cl.
*H04N 7/14*   (2006.01)

(52) U.S. Cl. ................................ 348/14.02; 455/556.1

(58) Field of Classification Search .. 348/14.01–14.16, 348/333.06, 373, 375, 376; 455/556.1, 557; 379/433.02; 396/287, 348
See application file for complete search history.

(56) References Cited

U.S. PATENT DOCUMENTS

| 6,104,808 A * | 8/2000 | Alameh et al. ......... 379/433.02 |
| 2001/0004269 A1 * | 6/2001 | Shibata et al. ......... 348/333.06 |

FOREIGN PATENT DOCUMENTS

| EP | 1 126 709 | 8/2001 |
| JP | 6-302169 | 10/1994 |
| JP | 10108152 A * | 4/1998 |
| JP | 2000-332865 | 11/2000 |
| JP | 2002-111801 | 4/2002 |
| JP | 2002-209133 | 7/2002 |
| WO | WO 01/31893 | 5/2001 |
| WO | WO 200131893 A1 * | 5/2001 |

OTHER PUBLICATIONS

Copy of European Search Report for corresponding European Patent Application No. 03701892 dated Mar. 8, 2005.

* cited by examiner

*Primary Examiner*—Wing Chan
(74) *Attorney, Agent, or Firm*—Armstrong, Kratz, Quintos, Hanson & Brooks, LLP

(57) ABSTRACT

The present invention provides a portable telephone which comprises a microphone 22 for speech transmission, cameras 3, 30 arranged on a casing, and a control circuit 10. The control circuit 10 varies the sensitivity of the microphone 22 in accordance with a photographing direction of one camera being operated.

3 Claims, 10 Drawing Sheets

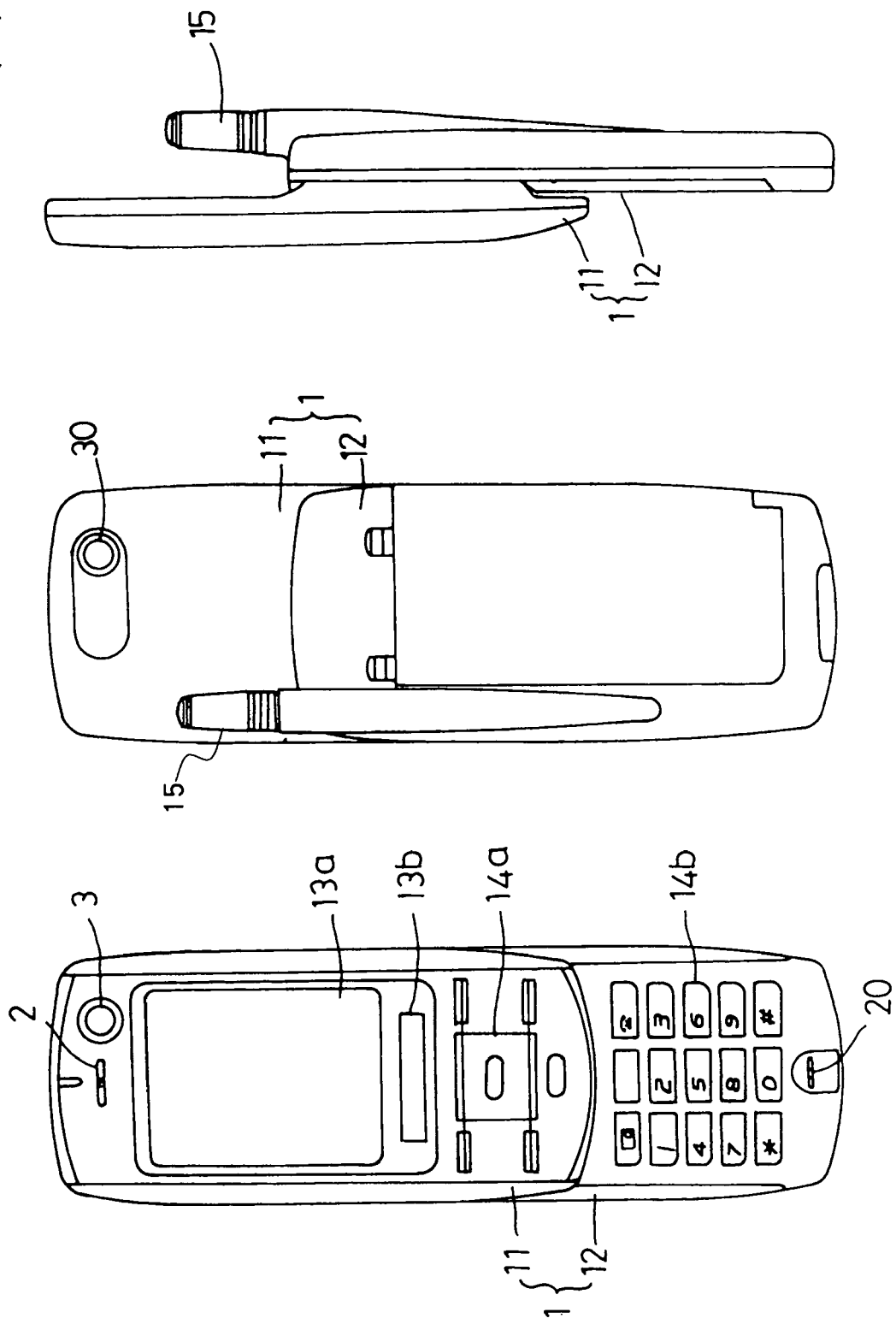

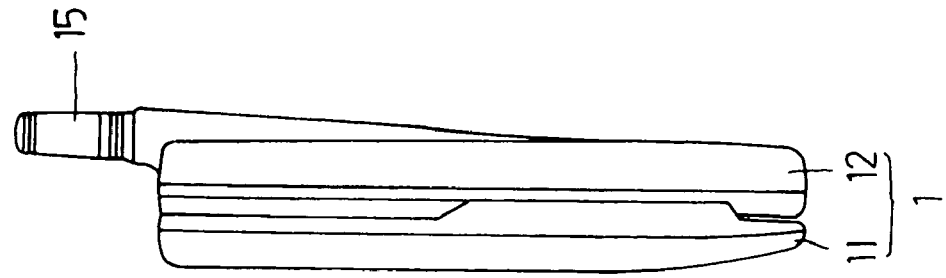
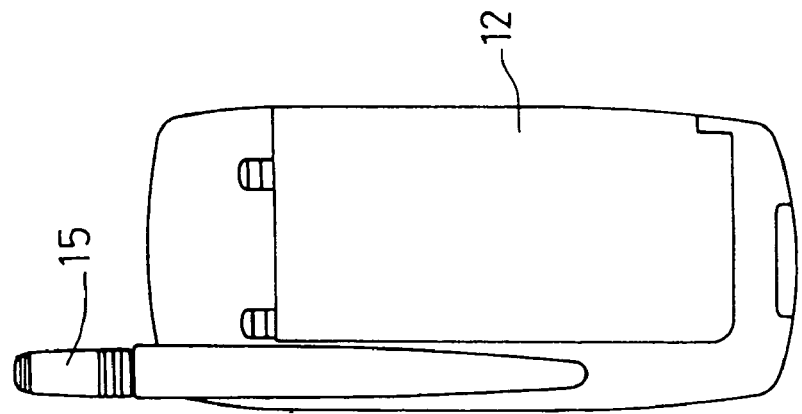
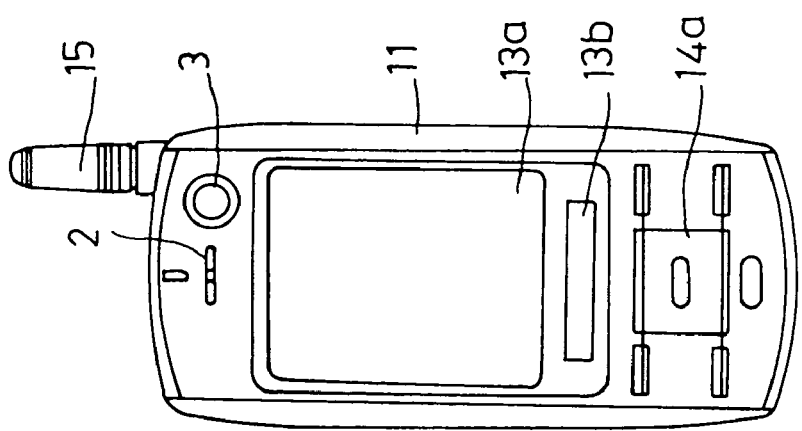

CELLULAR TELEPHONE

TECHNICAL FIELD

The present invention relates to portable telephones which comprise a portable casing having arranged therein one or a plurality of image pick-up devices such as a CCD (Charge Coupled Device) camera or a COMOS (Complementary Metal Oxide Semiconductor) sensor.

BACKGROUND ART

In recent years portable telephones have been in wide use which comprise image pick-up devices such as CCD cameras or COMOS sensors.

FIGS. 11 and 12 show a conventional portable telephone having a flat casing 8 comprising the combination of a front case 81 and a rear case 82. The casing 8 has a head provided with an antenna 83 as illustrated. The front case 81 has arranged on its surface a key input device 86 comprising a plurality of manipulation keys and a display 87. Provided on a surface of an upper end portion and bottom end portion of a surface of the front case 81, respectively, are a speech reception portion 84 incorporating a speaker and a speech transmission portion 85 incorporating a microphone.

On the other hand, a CCD camera 9 is arranged on a surface of an upper end portion of the rear case 82 as shown in FIG. 12. When the user depresses a shutter button, a picture taken by the CCD camera 9 at the moment is recorded in an incorporated memory (not shown) as a still picture.

With the portable telephone which has been developed in recent years and is adapted to record a moving picture and a voice at the same time, it is thought that a microphone for taking a moving picture is arranged in the casing in addition to the conventional microphone for making a call. This gives rise to the problem of making the device body greater in size.

It is possible that the conventional microphone for making a call is also used as a microphone for taking a moving picture.

However, in the case where with the conventional portable telephone shown in FIGS. 11 and 12 the microphone for making a call is also used as the microphone for taking a moving picture, there will be the problem that when the subject is positioned at the rear side opposite to the speech transmission portion 85 of the casing 8 in taking a moving picture, the voice of the subject cannot be recorded in a satisfactory level unless the subject produces a louder voice than a speaking phone caller because the sensitivity of the microphone for making a call is set at the optimum value for making a call.

An object of the present invention is to provide a portable telephone which is adapted to realize the recording function of picture and voice while approximately assuring the same external dimensions as the conventional portable telephone, and is adapted to record the voice of the subject in a satisfactory level regardless of a photographing direction if the subject produces approximately the same volume voice as that to be produced by a speaking phone caller.

DISCLOSURE OF THE INVENTION

The present invention provides a portable telephone comprising a portable casing having arranged thereon a microphone for speech transmission, which is characterized in that the telephone comprises:

one or a plurality of image pick-up devices which are arranged on the casing, memory means for recording a picture taken by the image pick-up device and a voice produced by the microphone, recording processing means for recording in the memory means the picture taken by the one image pick-up device and the voice produced by the microphone in accordance with the user's photographing manipulation, and sensitivity control means for varying microphone sensitivity in accordance with a photographing direction of said one image pick-up device being operated.

With the portable telephone of the present invention, photographing manipulation of the user records in the memory means a picture taken by an image pick-up device of said one or more image pick-up devices, and records a voice produced by the microphone. In this case the sensitivity control means varies the microphone sensitivity in response to a photographing direction of the image pick-up device. For example, when the photographing direction of the image pick-up device is opposed to a speech transmission portion arranged on the casing, the microphone sensitivity is caused to be higher than when making a call. Accordingly, the microphone sensitivity varies in accordance with the photographing direction, so that when the subject produces approximately the same level voice as that to be produced by a speaking phone caller, the voice of the subject can be recorded in a satisfactory level regardless of the photographing direction. The microphone for speech transmission is also used in taking a picture, so that the portable telephone body need not have a microphone for photograph. This realizes recording function of picture and voice while assuring approximately the same external dimensions as those of the conventional portable telephone.

Stated specifically, the portable telephone has a plurality of image pick-up devices arranged on the casing, and comprises judging means for judging which of the image pick-up devices is turned on. The sensitivity control means varies the microphone sensitivity with reference to the judging result.

According to the specific construction described, the casing has arranged on its front surface and rear surface a plurality of image pick-up devices. The microphone sensitivity varies with reference to the judging result of which of the image pick-up devices is turned on.

Stated more specifically, the casing has arranged on its front surface a speech transmission portion while arranged on its rear surface at least one image pick-up device of the plurality of image pick-up devices. When it is judged that the image pick-up device arranged on the rear surface of the casing is turned on, the sensitivity control means makes the microphone sensitivity higher than when a phone call is made.

When the subject is photographed by the image pick-up device arranged on the rear surface of the casing, the subject is positioned at the side opposite to the speech transmission portion arranged on the front surface of the casing. Therefore, according to the specific construction described, when it is judged that the image pick-up device arranged on the rear surface of the casing is turned on, the microphone sensitivity is caused to be higher than when a phone call is made.

Stated further specifically, the casing can be opened or closed, and the speech transmission portion is arranged on a position wherein the speech transmission portion is covered with the casing by closing the casing. The portable telephone comprises open-close detection means for detecting open-close state of the casing. When the closed state of the casing is detected, the sensitivity control means makes the microphone sensitivity higher than in the open state of the casing.

According to the specific construction, the speech transmission portion is covered with the casing with the casing closed. Accordingly, when the closed state of the casing is detected in making a phone call or in photographing with the image pick-up device, the microphone sensitivity is caused to be higher than in the open state of the casing.

As described above, the portable telephone of the present invention can realize recording function of picture and voice while assuring approximately the same external dimensions as those of the conventional portable telephone, and further record the voice of the subject regardless of the photographing direction when the subject produces approximately the same level voice as that to be produced by a speaking phone caller.

BRIEF DESCRIPTION OF THE DRAWINGS

FIG. 1(a) is a front view of a portable telephone, in its open state, of the first embodiment;
FIG. 1(b) is a rear view of the portable telephone in its open state;
FIG. 1(c) is a side elevation of the portable telephone in its open state;
FIG. 2(a) is a front view of the portable telephone in its closed state;
FIG. 2(b) is a rear view of the portable telephone in its closed state;
FIG. 2(c) is a side elevation of the portable telephone in its closed state.

BEST MODE FOR CARRYING OUT THE INVENTION

Figure 3:
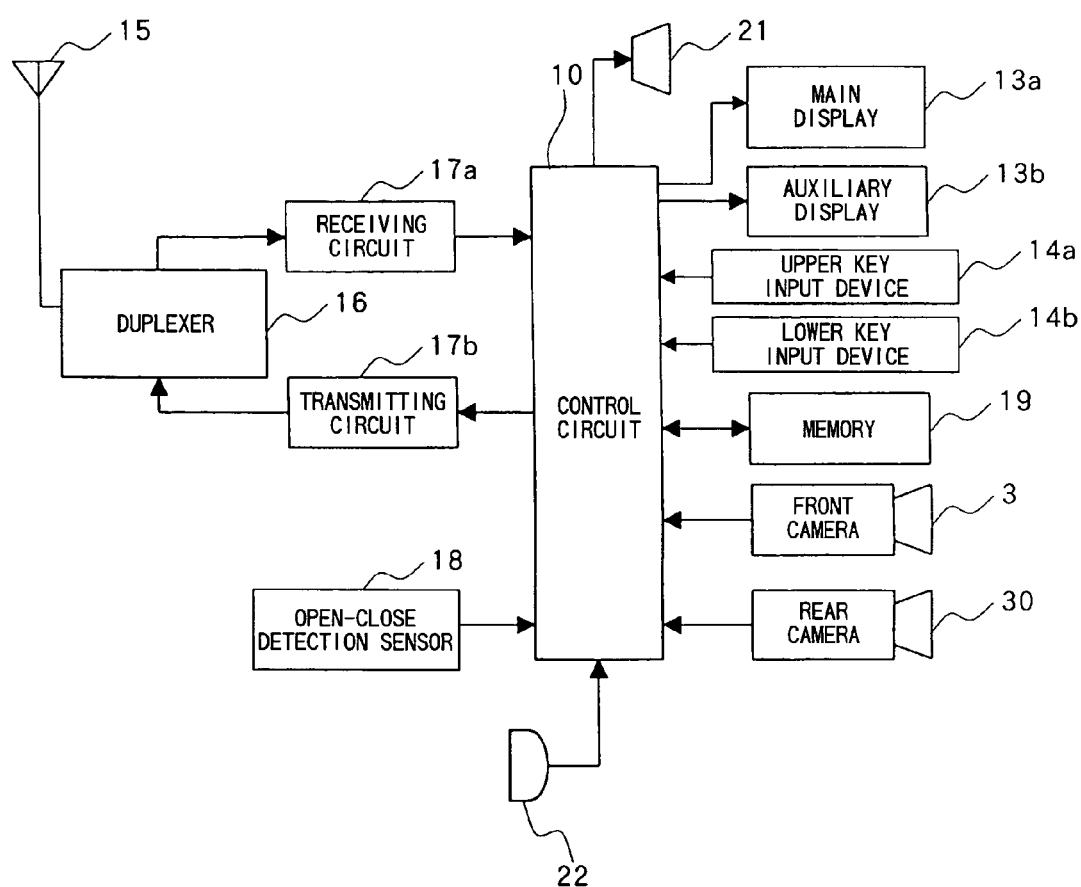
FIG. 3 is a block diagram showing the electrical construction of the portable telephone.

The present invention will be described below with reference to the three embodiments.

First Embodiment

A portable telephone of the present invention comprises a casing 1 having an upper half case 11 and a lower half case 12 as shown in FIGS. 1(a) to 1(c) and FIGS. 2(a) to 2(c). The upper half case 11 and the lower half case 12 are slidably in engagement with each other in a vertical direction. The portable telephone is openable to a state wherein the front position of the upper half case 11 and that of the lower half case 12 are vertically shifted each other as shown in FIGS. 1(a) to 1(c), and closable to a state wherein the front position of the upper half case 11 and that of the lower half case 12 conform to each other as shown in FIGS. 2(a) to 2(c), to thereby provide an openable/closable casing 1.

The upper half case 11 has arranged on its front surface a speech reception portion 2 incorporating a speaker, a main display 13a having an organic electroluminescence display, and an auxiliary display 13b having a liquid crystal display. The upper half case 11 has arranged on its front surface an upper key input device 14a having a plurality of manipulation keys. The key input device 14a can be manipulated either with the casing 1 opened as shown in FIG. 1(a) or with the casing 1 closed as shown in FIG. 2(a). Furthermore two CCD cameras 3, 30 are provided on upper ends of the front and rear surfaces, respectively, of the upper half case 11. The CCD camera 3 provided on the front surface of the upper half case 11, and which will be referred to as a front camera below can take a picture, with its lens portion exposed to the outside, when the casing 1 is either in its open state as shown in FIG. 1(a) or in closed state in FIG. 2(a). On the other hand, the CCD camera 30 provided on the rear surface of the upper half case 11, and which will be referred to as a rear camera below can take a picture, with its lens portion exposed to the outside, only when the casing 1 is in its closed state as shown FIG. 1(b).

The lower half case 12 has arranged on its front surface a speech transmission portion 20 incorporating a microphone and a lower key input device 14b comprising a plurality of manipulation keys. The key input device can be manipulated only when the casing 1 is in its open state as shown in FIG. 1(a). The lower half case 12 has arranged on a rear portion an extending antenna 15.

FIG. 3 shows the electric construction of the portable telephone. As illustrated, a reception circuit 17a and transmitting circuit 17b are connected together in parallel to a duplexer 16. A signal received by the antenna 15 is fed through the duplexer 16 to the receiving circuit 17a, and to demodulate a speech reception signal. The speech reception signal is fed to a speaker 21 via a control circuit 10 and output as voice. A speech transmission signal produced by a microphone 22 is fed through the control circuit 10 to the transmitting circuit 17b and modulated. The modulated speech transmission signal is fed to the duplexer 16 and transmitted from the antenna 15.

Connected to the control circuit 10 are the main display 13a, the auxiliary display 13b, the upper key input device 14a, the lower key input device 14b, the front camera 3, the rear camera 30, and a memory 19 for recording a picture and a voice. The control circuit 10 is further connected to an open-close detection sensor 18 for detecting opening and closing of the casing 1.

The portable telephone of the present invention makes it possible to record as a moving picture in the memory 19 a picture taken by the front camera 3 or the rear camera 30 and, at the same time, to record in the memory 19 a voice produced from the microphone 22, and to set video mode for enabling recording of moving picture and voice. Further the microphone sensitivity can be changed over into three levels; normal level which is best for making a call with the casing 1 open, the first high level which is higher than the normal level, and the second high level which is higher than the first level. The control circuit 10 changes over the microphone sensitivity into the three levels with reference to a sensor signal from the open-close detection sensor 18 and judging result of which camera of the front camera 3 and the rear camera 30 is turned on, as will be described below.

Figure 4:
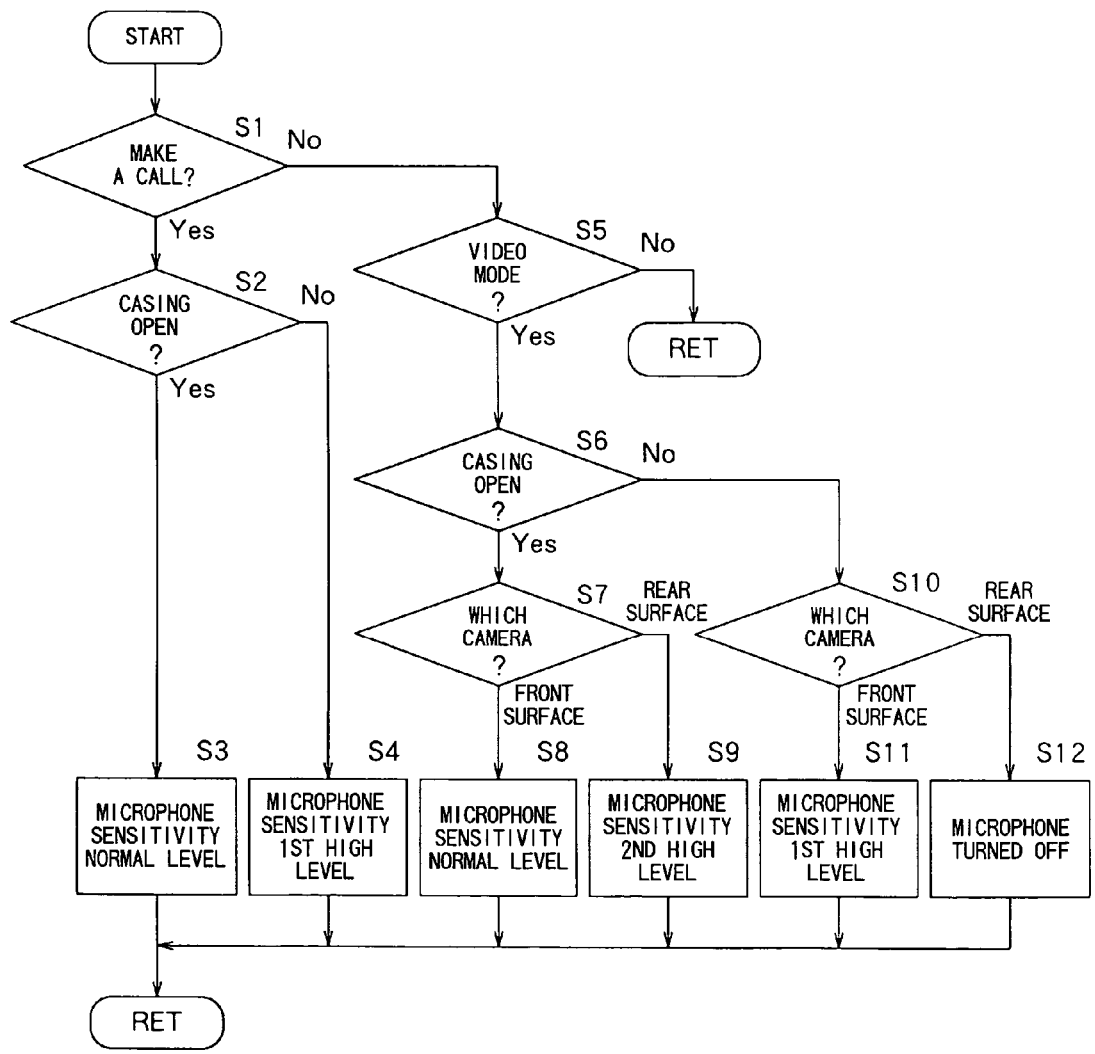
FIG. 4 is a flowchart showing a microphone sensitivity changing control procedure to be performed by the portable telephone.

FIG. 4 shows a microphone sensitivity changing-over control procedure to be performed by the control circuit 10. First in step S1 an inquiry is made as to whether the telephone is making a call. When the answer is affirmative, step S2 follows to inquire as to whether the casing 1 is opened with reference to the sensor signal from the open-close detection sensor 18. When the inquiry is answered in the affirmative, step S3 follows to set the microphone sensitivity to the normal level. When the inquiry is answered in the negative, step S4 follows to set the microphone sensitivity to the first high level and returns to step S1.

When the telephone is not making a call and the answer for step S1 is negative, step S5 follows to inquire as to whether video mode is set. When the answer is negative, step S1 follows again. On the other hand, when the answer for step S5 is affirmative, step S6 follows to inquire as to whether the casing 1 is opened with reference to the sensor signal from the open-close detection sensor 18. When the inquiry is answered in the affirmative, step S7 follows to inquire which of the front camera 3 and the rear camera 30 is turned on. If the front camera 3 is turned on, step S8 follows to set the microphone sensitivity to the normal level. If the rear camera 30 is turned on, step S9 follows to set the microphone sensitivity to the second high level and to return to step S1.

When the casing 1 is closed and the answer for step S6 is negative, step S10 follows to inquire which of the front camera 3 and the rear camera 30 is turned on. When the front camera 3 is turned on, step S11 follows to set the microphone sensitivity to the first high level and to return to step S1. When the rear camera 30 is turned on, step S12 follows to turn off the microphone and to return to step S1.

According to the procedure described, as will be apparent with reference to Table 1 below, the microphone sensitivity is set to the normal level when a phone call is made with the casing 1 opened, while the microphone sensitivity is set to the first high level when a phone call is made with the casing 1 closed. Further, the microphone sensitivity is set to the normal level when a picture is taken by the front camera 3 with the casing 1 opened, while the microphone sensitivity is set to the second high level when a picture is taken by the rear camera 30 with the casing 1 opened. Furthermore, the microphone sensitivity is set to the first high level when a picture is taken by the front camera 3 with the casing 1 closed. When the rear camera 30 is turned on with the casing 1 closed, the microphone is turned off. In this case the microphone is turned off because the lens portion of the rear camera 30 is covered with the casing 1 to make it impossible to photograph the subject.

TABLE 1

|  | casing | camera | microphone sensitivity |
|---|---|---|---|
| make a call | open |  | normal level |
|  | close |  | first high level |
| video mode | open | front surface | normal level |
|  |  | rear surface | second high level |
|  | close | front surface | first high level |
|  |  | rear surface | turned off |

The portable telephone of the present embodiment realizes recording function of moving picture and voice while assuring approximately the same external dimensions as those of the conventional portable telephone, by using the microphone 22 for making a call even in taking the moving picture.

With the portable telephone of the present embodiment, when a phone call is made with the casing 1 closed, the speech transmission portion 20 is covered with the upper half case 11. In this case the microphone sensitivity is set to the first high level which is higher than when a phone call is made with the casing 1 opened, so that when the phone caller produces approximately the same level voice as that to be produced with the casing 1 opened, the voice produced by the phone caller can be transmitted in a satisfactory level, as a speech transmission signal, to the telephone of the other party to whom the caller is speaking.

Further, when a picture is taken by the front camera 3 with the casing 1 closed, the speech transmission portion 20 is covered with the upper half case 11. In this case the microphone sensitivity is set to the first high level which is higher than when a phone call is made with the casing 1 opened, so that when the subject produces approximately the same level voice as that to be produced when a phone call is made with the casing 1 opened, the voice produced by the subject can be recorded in a satisfactory level.

Furthermore, when a picture is taken by the rear camera 30 with the casing 1 opened, the subject is positioned at the side opposite to the speech transmission portion 20 arranged on a front surface of the lower half case 12. In this case the microphone sensitivity is set to the second high level which is higher than when a phone call is made, so that when the subject produces approximately the same level voice as that to be produced by a speaking phone caller, the voice produced by the subject can be recorded in a satisfactory level.

Second Embodiment

Figure 5:
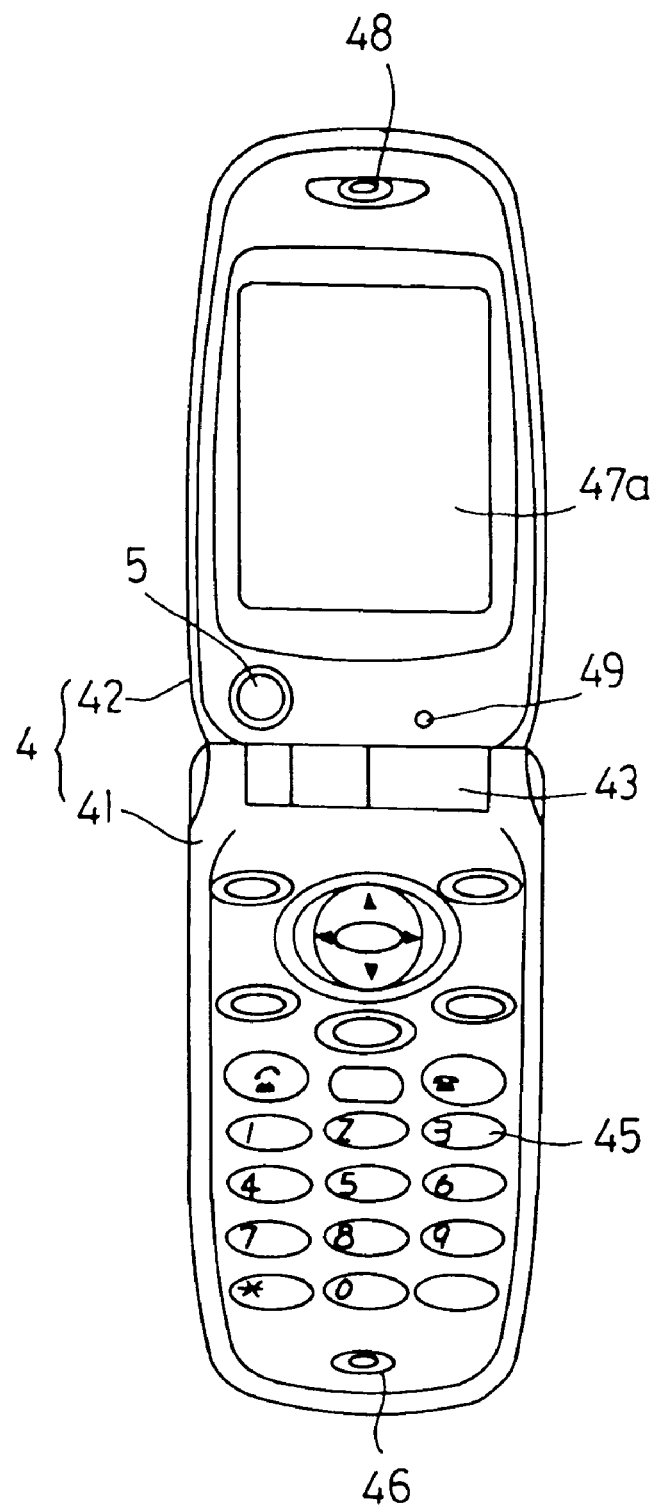
FIG. 5 is a front view of a portable telephone, in its open state, of the second embodiment.

The portable telephone of the present embodiment comprises a flat main body case 41 and a lid case 42 as shown in FIG. 5, FIGS. 6(a), 6(b). An upper end of the main body case 41 and a lower end of the lid case 42 are connected to each other by a hinge mechanism 43. The telephone can be opened to a state wherein the lid case 42 is open as shown in FIG. 5 and closed to a state wherein the lid case 42 is closed as shown in FIGS. 6(a), 6(b), to thereby provide a casing which is foldable.

The main body case 411 has arranged on a front surface thereof a key input device 45 having a plurality of manipulation keys, the main body case having a front surface provided at a lower end thereof with a speech transmission portion 46 incorporating a microphone. Further the main body case 41 has arranged on its rear portion an extending antenna 44.

Figure 6:
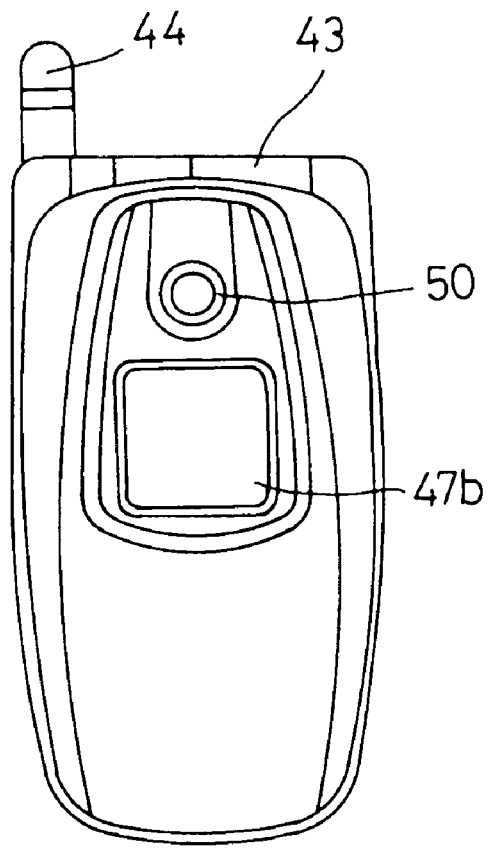
FIG. 6(a) is a front view of the portable telephone in its closed state.
FIG. 6(b) is a side elevation of the portable telephone in its closed state.
Figure 6:
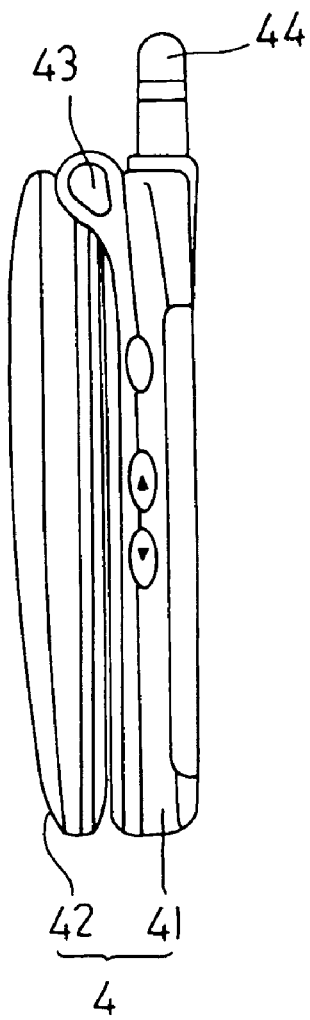

The lid case 42 has arranged on its front surface a main display 47a, the lid case having a front surface provided at an upper end thereof with a speech reception portion 48 incorporating a speaker. Further the lid case 41 has arranged on a front surface thereof an open-close detection switch 49 for detecting opening-closing of the lid case 42. While the open-close detection switch 49 is turned on by closing the lid case 42, the switch 49 is turned off by opening the lid case 42. The lid case 42 has arranged on its front surface a CCD camera 5, which can take a picture only when the lid case 42 is opened and the lens portion is exposed to the outside. The lid case 42 has arranged on its rear surface an auxiliary display 47b and a CCD camera 50 as shown in FIG. 6. When the casing 4 is either in its open state as shown in FIG. 5 or closed state in FIG. 6(a), the lens portion is exposed to the outside enabling the CCD camera 50 to take a picture.

The portable telephone of the present embodiment can set video mode for enabling recording of moving picture and voice, and change over the microphone sensitivity into the three levels as in the first embodiment.

Figure 7:
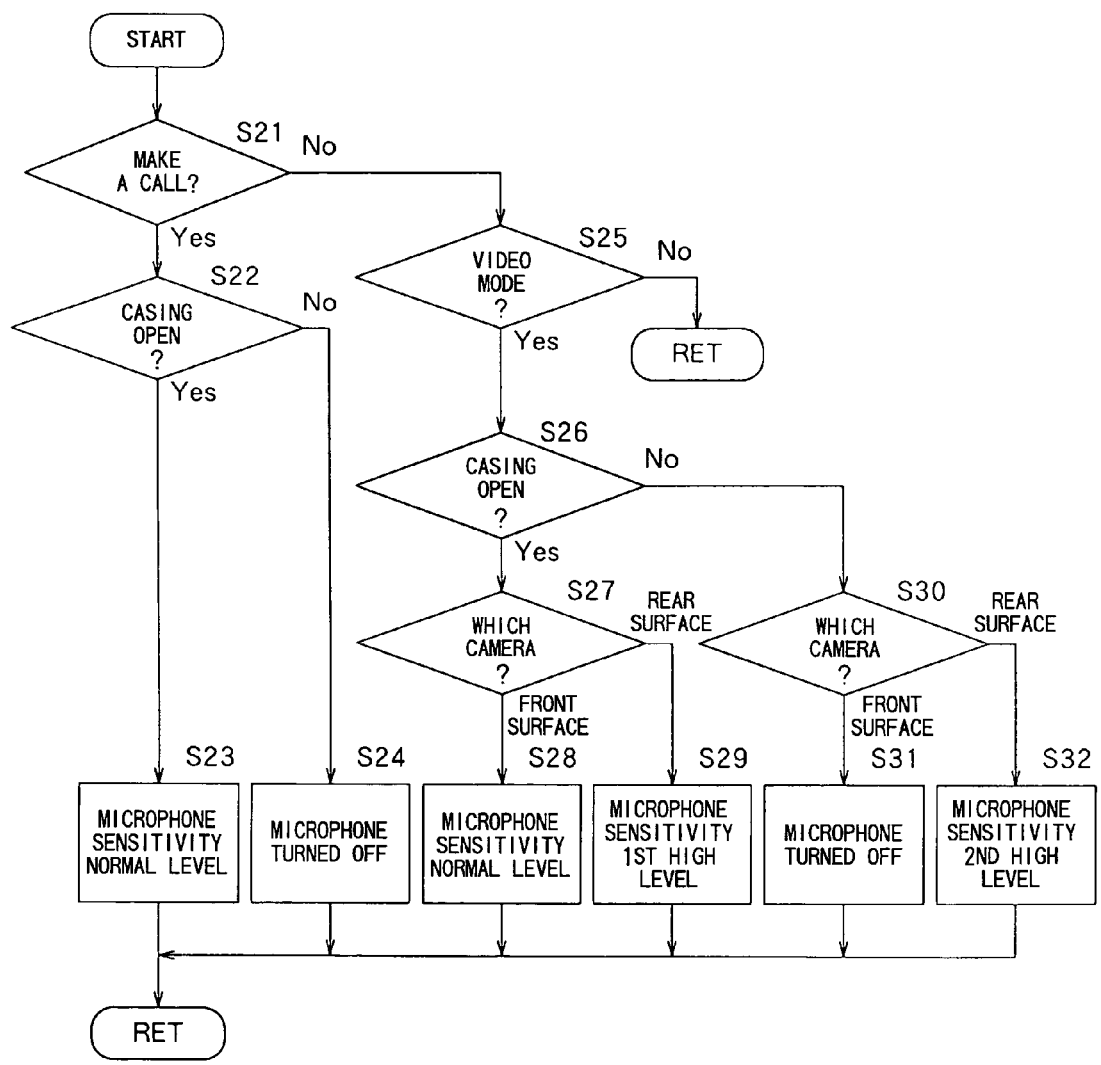
FIG. 7 is a flowchart showing a microphone sensitivity changing control procedure to be performed by the portable telephone.

FIG. 7 shows a microphone sensitivity changing-over control procedure to be performed by a control circuit of the present embodiment. First in step S21 an inquiry is made as to whether the telephone is making a call. When the answer is affirmative, step S22 follows to inquire as to whether the casing 4 is opened with reference to an on/off signal from the open-close detection switch 49. When the inquiry is answered in the affirmative, step S23 follows to set the microphone sensitivity to the normal level. When the inquiry is answered in the negative, step S24 follows to turn off the microphone and to return to step S21.

When the telephone is not making a call and the answer for step S21 is negative, step S25 follows to inquire as to whether video mode is set. When the answer is negative, step S21 follows again. On the other hand, the answer for step S25 is affirmative, step S26 follows to inquire as to whether the casing 4 is opened with reference to an on/off signal from the open-close detection switch 49. When the inquiry is answered in the affirmative, step S27 follows to inquire which of the front camera 5 and the rear camera 50 is turned on. If the front camera 5 is turned on, step S28 follows to set the microphone sensitivity to the normal level. If the rear camera 50 is turned on, step S29 follows to set the microphone sensitivity to the first high level and to return to step S21.

When the casing 4 is closed and the answer for step S26 is negative, step S30 follows to inquire which of the front camera 5 and the rear camera 50 is turned on. When the front camera 5 is turned on, step S31 follows to turn off the microphone and to return to step S21. When the rear camera 50 is turned on, step S32 follows to set the microphone sensitivity to the second high level and to return to step S21.

According to the procedure described, as will be apparent with reference to Table 2 below, the microphone sensitivity is set to the normal level when a phone call is made with the casing 4 opened, and thereafter the casing 4 is closed while making a call to turn off the microphone. In this case the microphone is turned off because closing the casing 4 terminates the phone call to the other party to which the telephone user is speaking. Further, the microphone sensitivity is set to the normal level when a picture is taken by the front camera 5 with the casing 4 opened, while the microphone sensitivity is set to the first high level when a picture is taken by the rear camera 50 with the casing 4 opened. Furthermore, the microphone is turned off when the front camera 5 is turned on with the casing 4 closed. In this case the microphone is turned off because the lens portion of the front camera 5 is covered with the casing 4 to make it impossible to photograph the subject. On the other hand, when a picture is taken by the rear camera 50 with the casing 4 closed, the microphone sensitivity is set to the second high level.

TABLE 2

|  | casing | camera | microphone sensitivity |
|---|---|---|---|
| make a call | open |  | normal level |
|  | close |  | turned off |
| video mode | open | front surface | normal level |
|  |  | rear surface | first high level |
|  | close | front surface | turned off I |
|  |  | rear surface | second high level |

The portable telephone of the present embodiment realizes recording function of moving picture and voice while assuring approximately the same external dimensions as those of the conventional portable telephone, by using a microphone for making a call even in taking the moving picture.

With the portable telephone of the present embodiment, when a picture is taken by the rear camera 50 with the casing 4 opened, the subject is positioned at the side opposite to the speech transmission portion 46 arranged on a front surface of the main body case 41. In this case the microphone sensitivity is set to the first high level which is higher than when a phone call is made, so that when the subject produces approximately the same level voice as that to be produced by a speaking phone caller, the voice produced by the subject can be recorded in a satisfactory level.

With the portable telephone of the present embodiment, when a picture is taken by the rear camera 50 with the casing 4 closed, the speech transmission portion 46 is covered with the lid case 42. In this case the microphone sensitivity is set to the first high level which is higher than when a phone call is made with the casing 4 opened, so that when the subject produces approximately the same level voice as that to be produced when a phone call is made with the casing 4 opened, the voice produced by the subject can be recorded in a satisfactory level.

Third Embodiment

Figure 8:
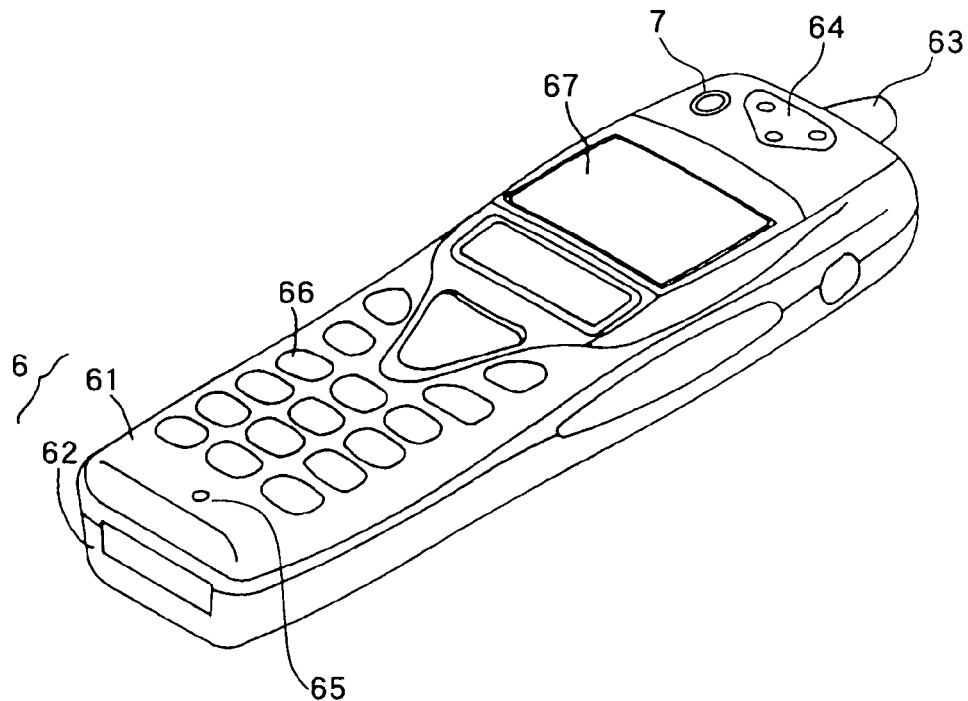
FIG. 8 is a perspective view of a portable telephone of the third embodiment and as viewed from the front side thereof.
Figure 9:
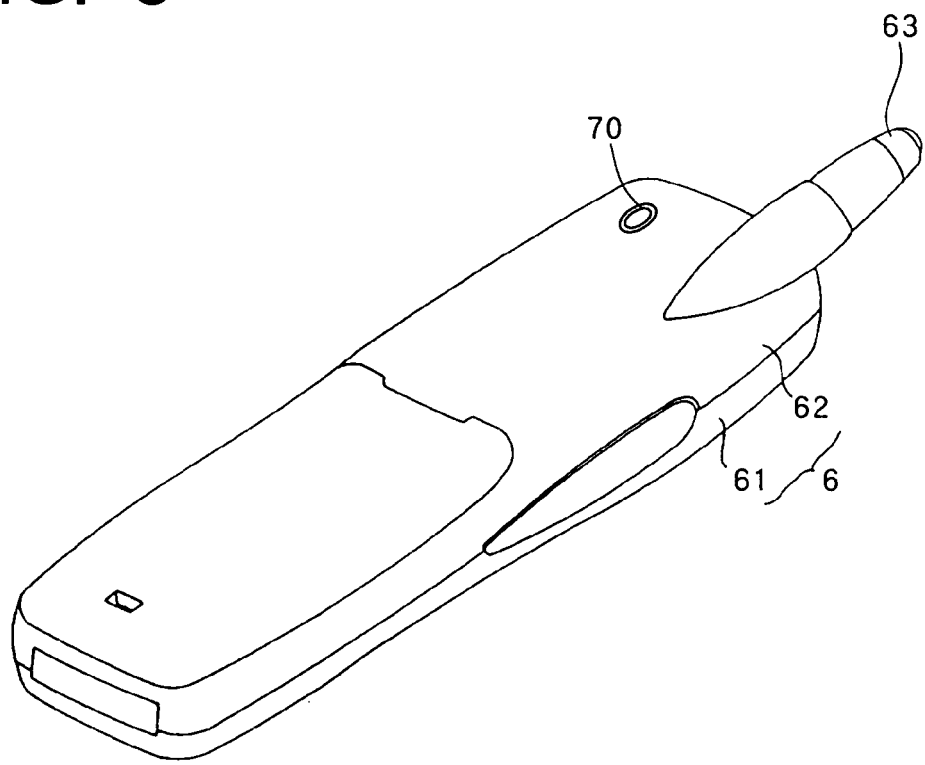
FIG. 9 is a perspective view of the portable telephone and as viewed from the rear side thereof.

The portable telephone of the present embodiment having a flat casing 6 comprising the combination of a front case 61 and a rear case 62 as shown in FIGS. 8 and 9. The casing 6 has a head provided thereof with an antenna 63. The front case 61 has arranged on its surface a display 67 and a key input device 66 comprising a plurality of manipulation keys. Provided on a surface of an upper end portion and bottom end portion of the front case 61 are, respectively, a speech reception portion 64 incorporating a speaker and a speech transmission portion 65 incorporating a microphone. Furthermore, provided on surfaces of upper ends of the front case 61 and the rear case 62, respectively, are CCD cameras 7, 70.

The portable telephone of the present embodiment can set video mode for enabling recording of moving picture and voice, and change over the microphone sensitivity between two levels; the normal level which is best for making a call and the high level which is higher than the normal level.

Figure 10:
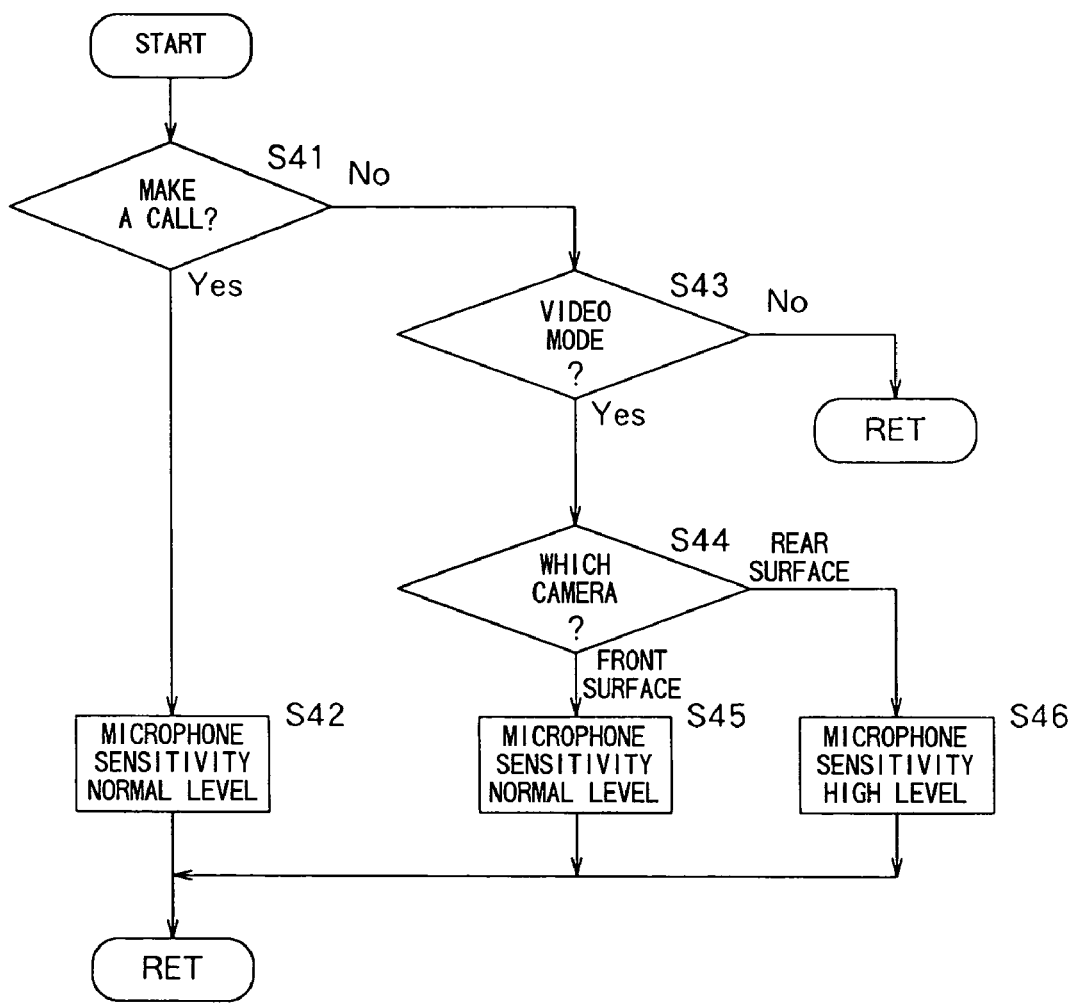
FIG. 10 is a flowchart showing a microphone sensitivity changing control procedure, which is executed by the portable telephone.
Figure 11:
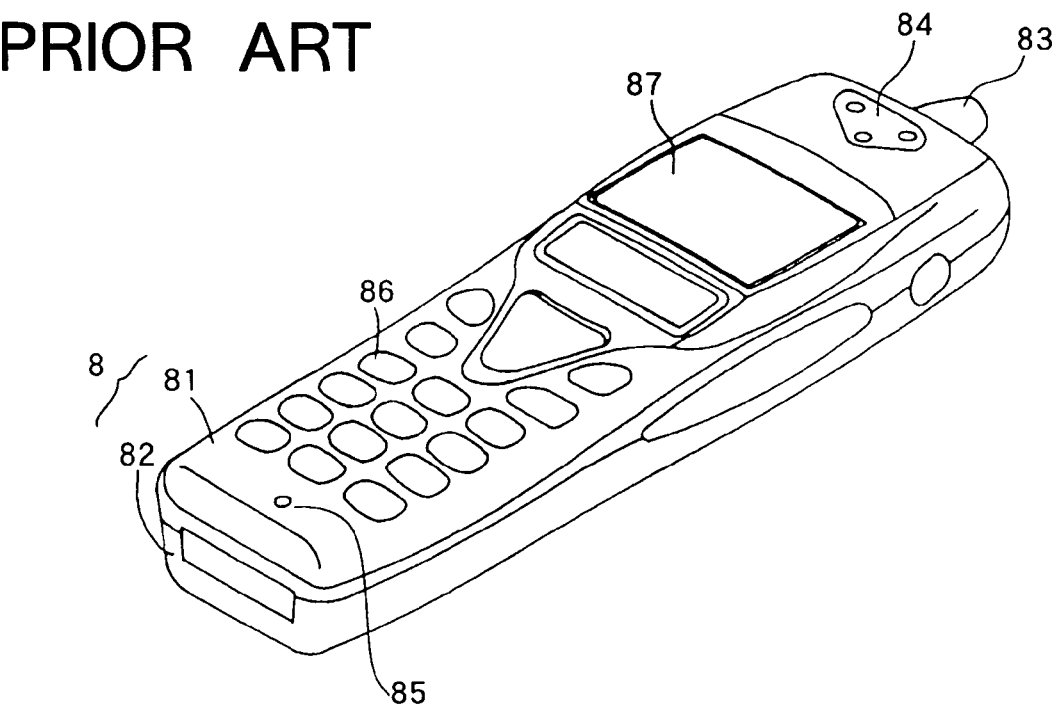
FIG. 11 is a perspective view of the conventional portable telephone and as viewed from the front side thereof.
Figure 12:
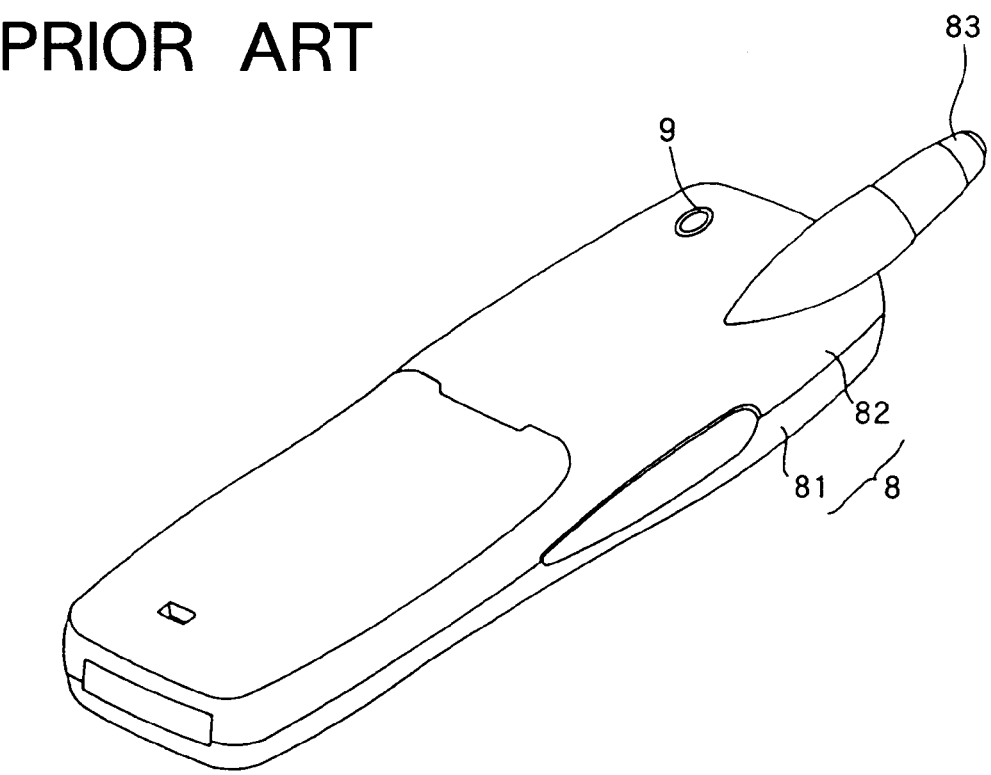
FIG. 12 is a perspective view of the conventional portable telephone and as viewed from the rear side thereof.

FIG. 10 shows a microphone sensitivity changing-over control procedure to be performed by a control circuit of the present embodiment. First in step S41 an inquiry is made as to whether the telephone is making a call. When the answer is affirmative, step S42 follows to set the microphone sensitivity to the normal level and to return to step S41.

When the telephone is not making a call and the answer for step S41 is negative, step S43 follows to inquire as to whether video mode is set. When the answer is negative, step S41 follows again. On the other hand, the answer for step S43 is affirmative, step S44 follows to inquire which of the front camera 7 and the rear camera 70 is turned on. If the front camera 7 is turned on, step S45 follows to set the microphone sensitivity to the normal level. If the rear camera 70 is turned on, step S46 follows to set the microphone sensitivity to the high level and to return to step S41.

According to the procedure described, as will be apparent with reference to Table 3 below, the microphone sensitivity is set to the normal level when a phone call is made. The microphone sensitivity is set to the normal level when a picture is taken by the front camera 7, while the microphone sensitivity is set to the high level when a picture is taken by the rear camera 70.

TABLE 3

| | camera | microphone sensitivity |
|---|---|---|
| make a call | | normal level |
| video mode | front surface | normal level |
| | rear surface | high level |

The portable telephone of the present embodiment realizes recording function of moving picture and voice while assuring approximately the same external dimensions as those of the conventional portable telephone, by using a microphone for making a call even in taking the moving picture.

With the portable telephone of the present embodiment, when a picture is taken by the rear camera 70, the subject is positioned at the side opposite to the speech transmission portion 65 arranged on a front surface of the casing 8. In this case the microphone sensitivity is set to the high level which is higher than when a phone call is made, so that when the subject produces approximately the same level speech as that to be produced by a speaking phone caller, the voice produced by the subject can be recorded in a satisfactory level.

The device of the invention is not limited to the embodiment but can of course be modified variously without departing from the technical scope of the invention as set forth in the claims.

For example, although the invention is embodied as the portable telephone comprising two cameras of a front camera and a rear camera according to the foregoing embodiments, the portable telephone is not limitative but the invention can of course be embodied as a portable telephone having one camera and being adapted to change a photographing direction of the camera. Such a portable telephone can detect a photographing direction of the camera in taking a moving picture, and vary the microphone sensitivity with reference to the detected result.

Furthermore, the present invention can also be embodied as the portable telephone, which is adapted for picture phone communications. With the portable telephone of this type, the microphone sensitivity is caused to be higher in the picture phone communications, for example, than in the usual speech communications.

The invention claimed is:

1. A portable telephone comprising a portable casing having arranged thereon a microphone for speech transmission, the portable telephone being characterized in that the telephone comprises:
    a plurality of image pick-up devices which are arranged on the casing,
    memory means for recording a picture taken by the image pick-up device and a voice produced by the microphone,
    recording processing means for recording in the memory means the picture taken by the one image pick-up device and the voice produced by the microphone in accordance with the user's photographing manipulation,
    judging means for judging which of the image pick-up devices is turned on, and
    sensitivity control means for varying microphone sensitivity with reference to said judging result.

2. A portable telephone according to claim 1 wherein the casing has arranged on its front surface a speech transmission portion while arranged on its rear surface at least one image pick-up device of the plurality of image pick-up devices, and when it is judged that the image pick-up device arranged on the rear surface of the casing is turned on, the sensitivity control means makes the microphone sensitivity higher than when a phone call is made.

3. A portable telephone according to claim 2 wherein the casing can be opened or closed, the speech transmission portion is arranged on a position wherein the speech transmission portion is covered with the casing by closing the casing, the portable telephone comprises open-close detection means for detecting open-close state of the casing, and when the closed state of the casing is detected, the sensitivity control means makes the microphone sensitivity higher than in the open state of the casing.

* * * * *

UNITED STATES PATENT AND TRADEMARK OFFICE
CERTIFICATE OF CORRECTION

| | | |
|---|---|---|
| PATENT NO. | : 7,002,616 B2 | Page 1 of 1 |
| APPLICATION NO. | : 10/488107 | |
| DATED | : February 21, 2006 | |
| INVENTOR(S) | : Taneya et al. | |

It is certified that error appears in the above-identified patent and that said Letters Patent is hereby corrected as shown below:

Title page,
Item [54], Title, change "CELLULAR TELEPHONE" to be -- PORTABLE TELEPHONE --.

Signed and Sealed this

Twenty-seventh Day of June, 2006

JON W. DUDAS
*Director of the United States Patent and Trademark Office*